(12) United States Patent
Lee (10) Patent No.: US 10,461,899 B2
(45) Date of Patent: Oct. 29, 2019

(54) METHOD AND APPARATUS FOR SELECTING ANTENNAS IN WIRELESS COMMUNICATION SYSTEM

(71) Applicant: Samsung Electronics Co., Ltd., Suwon-si, Gyeonggi-do (KR)

(72) Inventor: Ikbeom Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 15/145,328

(22) Filed: May 3, 2016

(65) Prior Publication Data

US 2016/0330750 A1 Nov. 10, 2016

(30) Foreign Application Priority Data

May 7, 2015 (KR) .................. 10-2015-0064035

(51) Int. Cl.
| | |
|---|---|
| *H04B 7/08* | (2006.01) |
| *H04L 5/00* | (2006.01) |
| *H04B 7/0452* | (2017.01) |
| *H04W 48/20* | (2009.01) |
| *H04W 88/08* | (2009.01) |

(52) U.S. Cl.
CPC ......... *H04L 5/0023* (2013.01); *H04B 7/0452* (2013.01); *H04B 7/0814* (2013.01); *H04B 7/0837* (2013.01); *H04W 48/20* (2013.01); *H04L 5/001* (2013.01); *H04L 5/006* (2013.01); *H04W 88/08* (2013.01)

(58) Field of Classification Search
CPC ... H04W 48/20; H04W 88/08; H04W 72/082; H04W 72/085; H04W 72/048; H04B 7/0452; H04B 7/0814; H04L 5/0023
See application file for complete search history.

(56) References Cited

U.S. PATENT DOCUMENTS

| | | | |
|---|---|---|---|
| 6,085,076 A | 7/2000 | Lindsay et al. | |
| 9,124,333 B1* | 9/2015 | Mansour | H04B 7/0874 |
| 2006/0276227 A1 | 12/2006 | Dravida | |
| 2007/0280097 A1* | 12/2007 | Yang | H04L 27/2647 |
| | | | 370/206 |
| 2011/0244905 A1* | 10/2011 | Burstrom | H04L 1/20 |
| | | | 455/507 |
| 2012/0134279 A1 | 5/2012 | Tamaki | |
| 2012/0142295 A1 | 6/2012 | Tseng et al. | |
| 2012/0149411 A1 | 6/2012 | Miyoshi et al. | |
| 2012/0208581 A1 | 8/2012 | Ishida et al. | |

(Continued)

FOREIGN PATENT DOCUMENTS

KR 20120055747 A 6/2012

*Primary Examiner* — Mandish K Randhawa
(74) *Attorney, Agent, or Firm* — Jefferson IP Law, LLP (57) ABSTRACT

A base station and an antenna selection method and apparatus thereof are provided. The antenna selection method includes receiving signals through multiple antennas, measuring channel information from the received signals, determining antennas having received signals whose channel information is higher than or equal to a preset threshold, and combining and processing the signals having received through the determined antennas. As a result, the base station may select an antenna enabling effective uplink communication with a user equipment among multiple antennas.

14 Claims, 7 Drawing Sheets

(56) References Cited

U.S. PATENT DOCUMENTS

| | | | |
|---|---|---|---|
| 2012/0257664 A1* | 10/2012 | Yue | H04B 7/0452 |
| | | | 375/227 |
| 2013/0301452 A1 | 11/2013 | Yoon | |
| 2014/0210487 A1 | 7/2014 | Ohara et al. | |
| 2015/0003380 A1 | 1/2015 | Ling et al. | |
| 2015/0215020 A1 | 7/2015 | Kim et al. | |
| 2015/0349870 A1* | 12/2015 | Chen | H04B 7/0822 |
| | | | 375/347 |

* cited by examiner

METHOD AND APPARATUS FOR SELECTING ANTENNAS IN WIRELESS COMMUNICATION SYSTEM

CROSS-REFERENCE TO RELATED APPLICATION(S)

This application claims the benefit under 35 U.S.C. § 119(a) of a Korean patent application filed on May 7, 2015 in the Korean Intellectual Property Office and assigned Serial number 10-2015-0064035, the entire disclosure of which is hereby incorporated by reference.

TECHNICAL FIELD

The present disclosure relates to a method and apparatus for selecting antennas in a wireless communication system. More particularly, the present disclosure relates to a method that enables a base station supporting a distributed antenna system to select antennas for effective uplink communication with a user equipment.

BACKGROUND

In general, mobile communication systems have been developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

To meet this demand, the 3rd generation partnership project (3GPP) has been working to standardize specifications for the long term evolution (LTE) system as a next generation mobile communication system. The LTE system is expected to be commercially available in about 2010, and aims to realize high-speed packet based communication supporting a data rate of 100 Mbps. To this end, various approaches have been considered, such as reducing the number of nodes on a communication path through simplification of the network architecture and bringing wireless protocols as close as possible to wireless channels.

In the uplink of the LTE system, a base station may selectively combine and process signals received from user equipments. Hence, it is necessary to develop a scheme that enables the base station of a mobile communication system to select antennas with favorable channel states in real time and to combine and decode signals received through the selected antennas.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus that enable a base station of a wireless communication system to select antennas for effective uplink communication with a user equipment (UE) in real time.

In accordance with an aspect of the present disclosure, a method of antenna selection for a base station is provided. The method includes receiving signals through multiple antennas, measuring channel information from the received signals, determining antennas having received signals whose channel information is higher than or equal to a preset threshold, and combining and processing signals received through the determined antennas.

Determining antennas may include measuring the signal-to-noise ratio (SNR) or received power of the signals received through the multiple antennas as channel information.

Determining antennas may further include measuring the SNR or received power of the signals received through the multiple antennas on a subframe basis, and determining antennas whose SNR or received power is higher than or equal to a preset threshold on a subframe basis.

When the operating mode of the base station is multi-user multiple input multiple output (MU-MIMO), determining antennas may further include identifying the average channel information of the signals received through the antennas, and determining an antenna whose average channel information is greater than or equal to a preset threshold.

When the operating mode of the base station is MU-MIMO, determining antennas may further include selecting UEs with a large modulation and coding scheme (MCS) index and a large number of allocated resource blocks (RBs) for each antenna, comparing pieces of channel information of antenna signals for the selected UEs, and determining at least one antenna according to the comparison result.

Determining antennas may further include determining an antenna on the basis of channel information measured at an uplink data channel, and utilizing a signal received via the determined antenna for an uplink control channel corresponding to the uplink data channel.

Determining antennas may further include assigning different weights to the measured channel information according to antennas having received the signals, and determining antennas whose weighted channel information is greater than or equal to a preset threshold.

In accordance with another aspect of the present disclosure, a base station is provided. The base station includes a transceiver unit to send and receive signals through multiple antennas and a controller to perform a process of measuring channel information from the received signals, determining antennas having received signals whose channel information is higher than or equal to a preset threshold, and combining and processing signals received through the determined antennas.

The controller may measure the SNR or received power of the signals received through the multiple antennas as channel information.

The controller may measure the SNR or received power of the s received through the antennas on a subframe basis, and determine at least one antenna whose SNR or received power is higher than or equal to a preset threshold on a subframe basis.

When the operating mode of the base station is MU-MIMO, the controller may identify the average channel information of the signals received through the antennas, and determine an antenna whose average channel information is greater than or equal to a preset threshold.

When the operating mode of the base station is MU-MIMO, the controller may select UEs with a large MCS index and a large number of allocated RBs for each antenna, compare pieces of channel information of antenna signals for the selected UEs, and determine at least one antenna according to the comparison result.

The controller may determine an antenna on the basis of channel information measured at an uplink data channel, and utilize a signal received via the determined antenna for an uplink control channel corresponding to the uplink data channel.

The controller may assign different weights to the measured channel information according to antennas having received the signals, and determine antennas whose weighted channel information is greater than or equal to a preset threshold.

In a feature of the present disclosure, the base station of a wireless communication system may select an antenna enabling effective uplink communication with a UE in real time among multiple antennas.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The following description is focused on advanced devolved universal terrestrial radio access (E-UTRA) (long term evolution advanced (LTE-A)) supporting carrier aggregation. However, it should be understood by those skilled in the art that the subject matter of the present disclosure is applicable to other communication systems having similar technical backgrounds and channel configurations without significant modifications departing from the scope of the present disclosure. For example, the subject matter of the present disclosure may be applied to multicarrier high speed packet access (HSPA) supporting carrier aggregation.

Descriptions of components having substantially the same configurations and functions may be omitted.

In the drawings, some elements are exaggerated, omitted, or only outlined in brief, and thus may be not drawn to scale.

Further, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out operations of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as afield programmable gate array (FPGA) or application specific integrated circuit (ASIC) capable of carrying out a function or an operation. However, "unit" or the like is not limited to hardware or software. A unit or the like may be configured on as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

Figure 1:
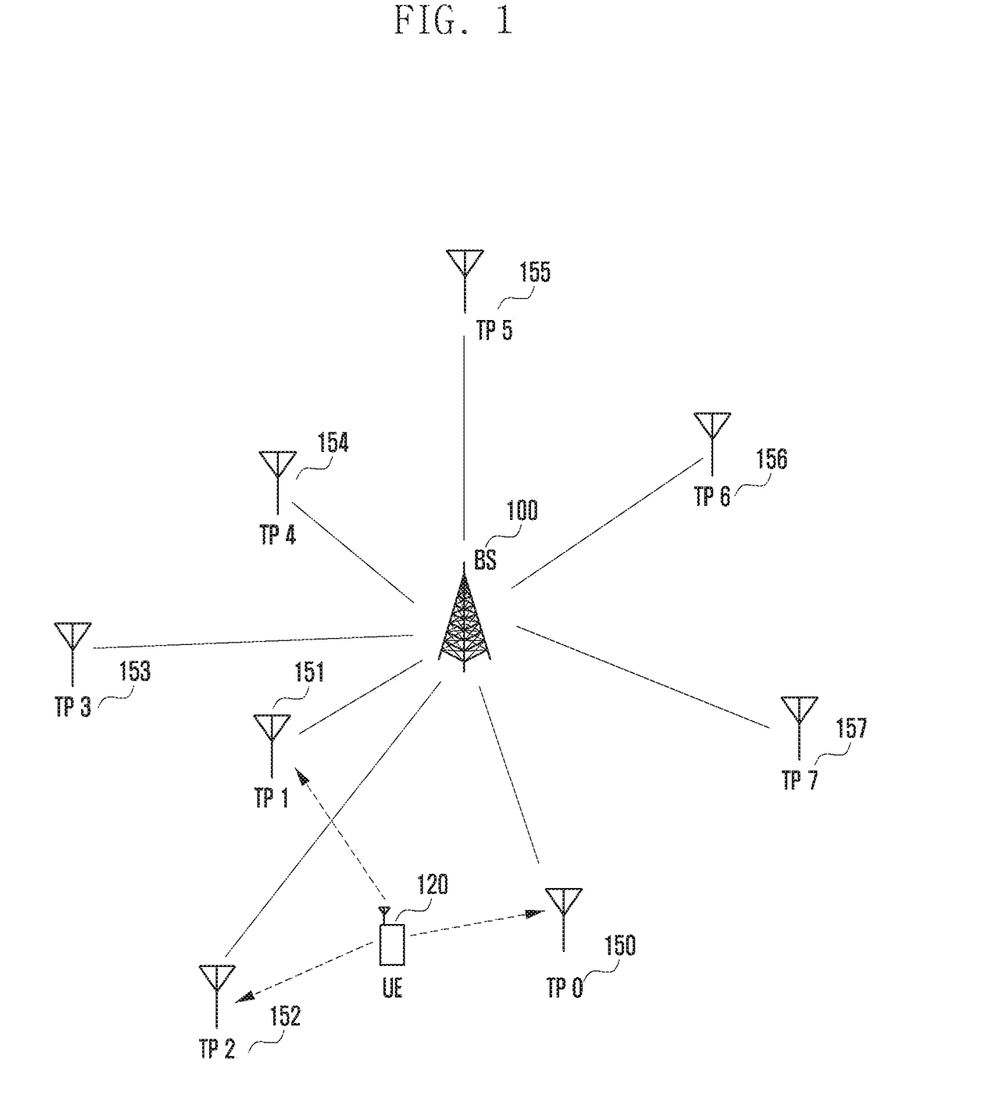
FIG. 1 illustrates a wireless communication system including a base station and multiple antennas of the base station according to an embodiment of the present disclosure.

FIG. 1 illustrates a wireless communication system including a base station (BS) and multiple antennas thereof according to an embodiment of the present disclosure.

Referring to FIG. 1, the BS 100 may use multiple antennas 150 to 157 to send and receive signals to and from user equipments (UEs) located in the coverage thereof. A signal may include a control signal and data.

In FIG. 1, eight antennas are shown in the coverage of the BS 100, but the number of antennas may vary depending upon the circumstances.

The serving area of the BS 100 may be divided into multiple sectors. Individual antennas may be separated at regular intervals so that the sectors contain the same number of antennas. For example, two antennas may be installed in each sector.

A mobile station (MS) or user equipment (UE) 120 may send or receive a signal to or from the BS 100 through one or more antennas.

When signals from the HE 120 are received through the multiple antennas 150 to 157, the BS 100 may select some of the antennas 150 to 157 according to channel information and combine signals received through the selected antennas for processing.

For example, when the HE 120 is close to the antennas TP0 (150), TP1 (151) and TP2 (152) as shown in FIG. 1, signals sent from the UE 120 through the antennas TP0 (150), TP1 (151) and TP2 (152) to the BS 100 may have favorable channel states.

Hence, for the HE 120, the BS 100 may combine and process signals received through only the antennas TP0 (150), TP1 (151) and TP2 (152) among the antennas 150 to 157.

In general, to select antennas with high received signal strength, the BS 100 may measure the signal-to-noise ratio (SNR) of signals sent by the HE 120 at a subframe allocated to the UE 120 and store the measurement results in advance. When the HE 120 has uplink data to be sent to the BS 100, the BS 100 may select antennas by using the stored SNR values to receive and combine data signals coming from the UE 120.

In the above antenna selection scheme, the time difference between the allocated subframe and the current subframe for antenna selection may be significant. This time difference may lower the reliability of SNR values obtained at the allocated subframe. Additionally, the BS 100 has to store and manage the measured SNR values.

To address the above problem, the sounding reference signal (SRS) periodically sent from the HE to the BS may be utilized. However, to use the SRS, the BS has to send the UE control information via a separate resource for SRS transmission of the UE.

In addition, interference conditions may differ between SRS and physical uplink shared channel (PUSCH)/physical uplink control channel (PUCCH). For example, in the case of SRS-based antenna selection, for selected antennas, channel conditions for PUSCH/PUCCH transmission may not be good enough, unlike channel conditions for SRS transmission. That is, the BS 100 may fail to receive good-quality signals through the antennas selected using SRSs. Consequently, SRS-based antenna selection may degrade reception accuracy of the BS 100.

Next, to solve the above problems and to efficiently select antennas, components of the BS are described with reference to FIG. 2.

Figure 2:
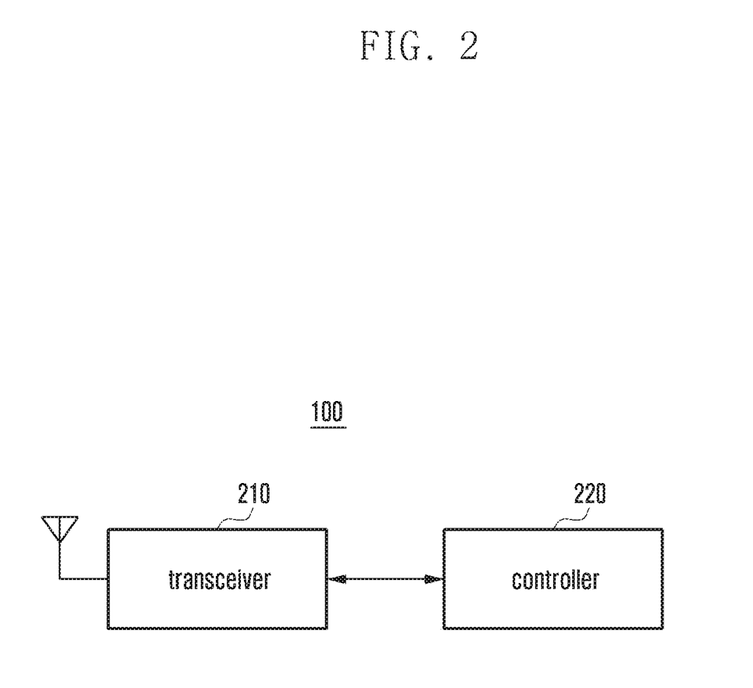
FIG. 2 is a block diagram of a base station according to an embodiment of the present disclosure.

FIG. 2 is a block diagram of the BS 100 according to an embodiment of the present disclosure.

Referring to FIG. 2, the BS 100 may include a transceiver unit 210 and a controller 220.

The transceiver unit 210 sends and receives data for wireless communication for the BS 100. The transceiver unit 210 may include a radio frequency (RE) transmitter for upconverting the frequency of a signal to be transmitted and amplifying the signal, and an RF receiver for low-noise amplifying a received signal and downconverting the frequency of the received signal. The transceiver unit 210 may forward data received through a wireless channel to the controller 220, and may transmit data from the controller 220 through the wireless channel.

The controller 220 controls the BS 100 to select antennas for effective communication with the UE 120 in the uplink. For example, the controller 220 may measure channel information using signals received through the transceiver unit 210, determine antennas having received a signal with channel information higher than equal to a preset threshold, and combine and process signals received through the determined antennas.

For channel information, the controller may measure the SNR or received power of signals received through multiple antennas.

For real-time antenna selection, the controller 220 may measure the SNR or received power of signals received through multiple antennas on a subframe basis, and determine at least one antenna whose SNR or received power is greater than or equal to the threshold on a subframe basis.

In the related art, there is a time difference between the subframe for channel information measurement and the current subframe for antenna selection. However, the BS 100 of the present disclosure may measure channel information and select antennas according to the measurement result in real time.

For channel information, the controller 220 may measure noise interference power. When noise interference power is measured as channel information, the controller 220 may determine antennas whose channel information is less than or equal to a preset threshold and combine and process signals received through the determined antennas.

As described above, the controller 220 may measure the SNR, received power, or noise interference power as channel information. However, the controller 220 may measure any other information enabling prediction of antenna channel states for channel information.

The controller 220 may select antennas using measured channel information and determine at least one antenna so that signals received through the selected antennas are processed without errors.

Meanwhile, when the operating mode of the BS 100 is multi-user multiple input multiple output (MU-MIMO), the BS 100 may receive signals sent by multiple UEs 120 through multiple antennas.

During MU-MIMO, the BS 100 may use multiple antennas to send and receive signals in real time to and from multiple UEs in the coverage thereof.

In one embodiment, for each antenna, the controller 220 may determine the average channel information of signals received through the antenna. The controller 220 may determine at least one antenna whose average channel information is greater than or equal to a preset threshold. For each UE, the controller 220 may combine and process multiple signals received through the determined antennas.

In another embodiment, the controller 220 may select UEs with a large MCS index and a large number of allocated RBs for each of multiple antennas. The controller 220 may compare pieces of channel information of antenna signals for the selected UEs and determine at least one antenna according to the comparison result.

For example, the controller 220 may select a UE with the largest MCS index and the largest number of allocated RBs for each antenna among UEs sending signals. The controller 220 may measure channel information of a signal sent by the selected UE through each antenna. The controller 220 may determine antennas having received a signal whose channel information is greater than or equal to a preset threshold. The controller 220 may combine and process multiple signals received through the determined antennas.

The controller 220 may determine an antenna on the basis of channel information measured at the uplink data channel and perform channel estimation on the uplink control channel corresponding to the uplink data channel by use of a signal received via the determined antenna.

For example, the controller 220 may utilize an antenna, which is used to decode data received through the uplink data channel, to receive data through the uplink control channel corresponding to the uplink data channel.

In another embodiment, the controller 220 may assign different weights to measured channel information according to antennas having received signals. The controller 220 may determine antennas whose weighted channel information is greater than or equal to a preset threshold.

For example, antennas close to the UE tend to have good channel conditions. Hence, the controller 220 may assign a high weight to a signal received through an antenna placed in the same sector as the UE.

After selecting antennas to receive uplink signals using one of the schemes described above, the controller 220 may combine and process signals received through the selected antennas.

Accordingly, the BS 100 may select antennas with good channel conditions in real time by measuring channel information on a subframe basis.

The BS 100 may select antennas by use of various types of channel information indicating channel states. For example, the BS 100 may measure the SNRs of signals received through multiple antennas and use the SNR information as channel information. Next, a description is given of a configuration that enables the BS 100 to measure the SNRs of signal s received through multiple antennas and to select antennas with reference to FIGS. 3A and 3B.

Figure 3A:
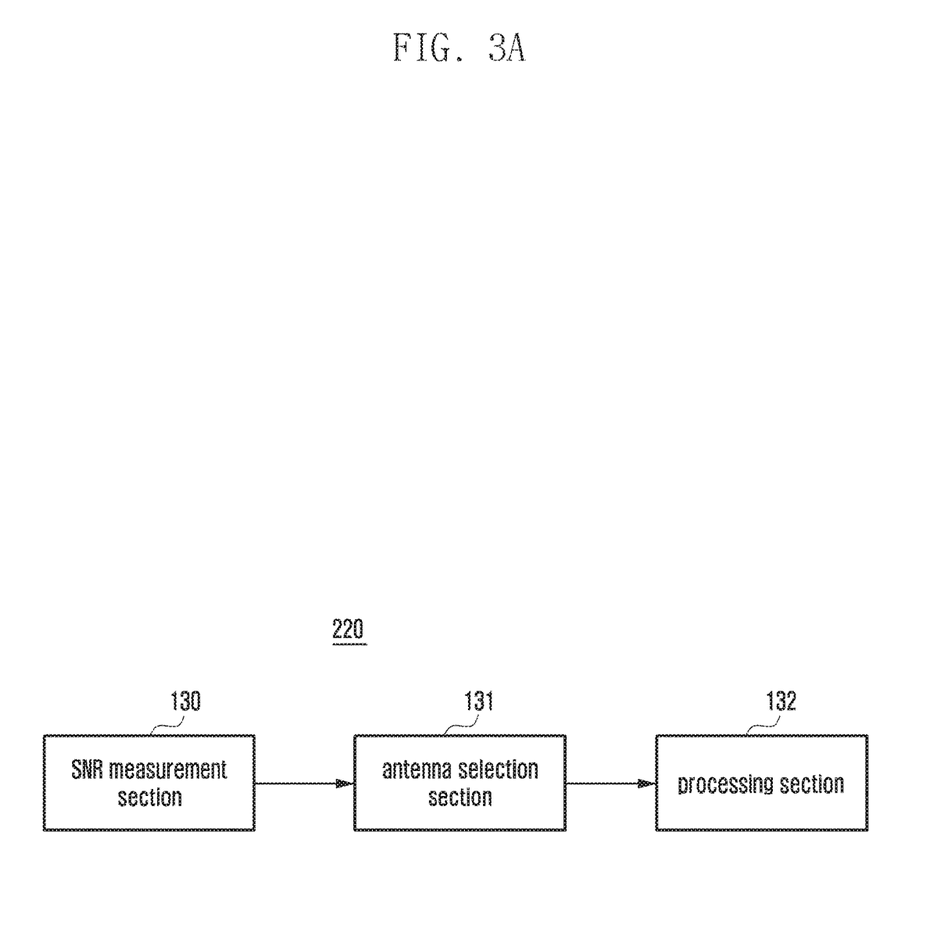
FIGS. 3A and 3B are block diagrams of a controller of the base station according to embodiments of the present disclosure.

FIG. 3A is a block diagram of a controller of the BS according to an embodiment of the present disclosure.

Referring to FIG. 3A, the controller 220 may include an SNR measurement section 130, an antenna selection section 131, and a processing section 132.

The SNR measurement section 130 may measure SNRs of signals received through each of multiple antennas. For example, the SNR measurement section 130 may measure the SNR of each signal on a subframe basis.

When the operating mode of the BS 100 is MU-MIMO, the SNR measurement section 130 may compute the average of SNRs of signals received through each antenna.

The antenna selection section 131 may select antennas by use of the SNRs measured by the SNR measurement section 130. For example, the antenna selection section 131 may determine a signal whose SNR is greater than or equal to a preset threshold. The antenna selection section 131 may select the antenna having received the determined signal.

It is possible to set the number of selectable antennas. Hence, when there are multiple signals whose SNR is greater than or equal to a preset threshold, the antenna selection section 131 may select a given number of antennas in descending order of SNR.

When the operating mode of the BS 100 is MU-MIMO and the average of SNRs of signals received through each antenna is computed by the SNR measurement section 130, the antenna selection section 131 may select an antenna having received signals whose average SNR value is greater than or equal to a preset threshold.

In one embodiment, the SNR measurement section 130 may compute SNRs of signals received through each antenna and forward the SNR values to the antenna selection section 131, and the antenna selection section 131 may compute the average of SNR values for each antenna and select an antenna having received signals whose average SNR value is greater than or equal to a preset threshold.

Alternatively, when the operating mode of the BS 100 is MU-MIMO, the antenna selection section 131 may select a UE with the largest MCS index and the largest number of allocated RBs for each of multiple antennas. The antenna selection section 131 may examine the SNR values of signals sent by the selected UEs, determine a signal whose SNR value is greater than or equal to a preset threshold, and select the antenna having received the determined signal.

The processing section 132 may process signals received through the antenna selected by the antenna selection section 131 in real time. For example, the processing section 132 may combine signals received through the selected antenna and decode the combined signal.

Figure 3B:
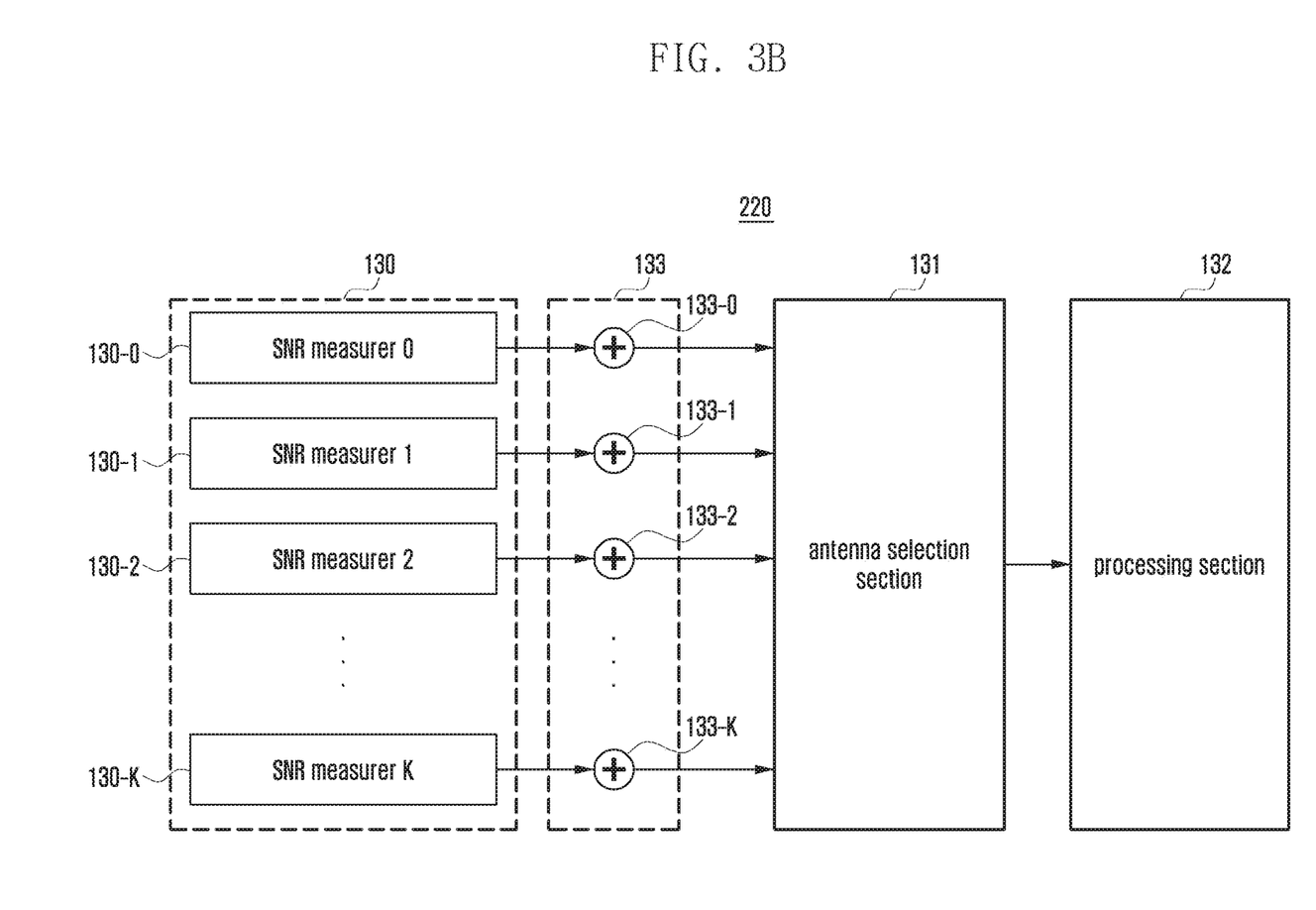

FIG. 3B is a block diagram illustrating components of the controller 220 according to an embodiment of the present disclosure.

Referring to FIG. 3B, the controller 220 may include an SNR measurement section 130, a weighting control section 133, an antenna selection section 131, and a processing section 132.

The SNR measurement section 130 may include multiple SNR measurers 130-0 to 130-K. Each of the SNR measurers 130-0 to 130-K may compute an SNR value of a signal received through an antenna. The configuration of the SNR measurers 130-0 to 130-K is described in detail later.

The weighting control section 133 may assign weights (133-0 to 133-K) to the SNR values computed by the SNR measurers 130-0 to 130-K. The weighting control section 133 may assign different weights (133-0 to 133-K) to the SNR values according to antennas having received a signal.

For example, the weighting control section 133 may assign a high weight to the SNR of a signal received through an antenna placed in the same sector as the UE. When the distance to the UE or an antenna is large, the weighting control section 133 may assign a low weight to the SNR of a signal received through the antenna.

Hence, the controller 220 may select an antenna for signal reception in consideration of the measured channel information and location of the UE.

The antenna selection section 131 may select antennas by use of measured SNR values. The antenna selection section 131 may select an antenna having received a signal whose weighted SNR value is greater than or equal to a preset threshold.

It is possible to set the number of selectable antennas. For example, when up to four antennas are selectable, the antenna selection section 131 may select four signals in descending order of weighted SNR from among signals whose weighted SNR value is greater than or equal to a preset threshold, and determine antennas having received the selected signals.

When the operating mode of the BS 100 is MU-MIMO, each of the SNR measurers 130-0 to 130-K may compute SNR values of signals received through an antenna and determine the average of the SNR values.

The weighting control section 133 may assign weights (133-0 to 133-K) to averages of SNR values computed by the SNR measurers 130-0 to 130-K. The antenna selection section 131 may select an antenna on the basis of weighted averages of SNR values. That is, the antenna selection section 131 may select an antenna having received signals whose weighted SNR average is greater than or equal to a preset threshold.

When the operating mode of the BS 100 is MU-MIMO, the antenna selection section 131 may select a UE representing channel conditions for each antenna first and compare SNR values of signals sent by the selected UEs.

For example, the SNR measurers 130-0 to 130-K may compute SNR values of signals received through antennas, and the weighting control section 133 may assign different weights (133-0 to 133-K) to the SNR values according to the antennas having received signals.

The antenna selection section 131 may select a UE with the largest MCS index and the largest number of allocated RBs for each antenna. The antenna selection section 131 may examine the weighted SNR values of signals sent by the selected UEs, determine a signal whose weighted SNR value is greater than or equal to a preset threshold, and select the antenna having received the determined signal.

Hence, the antenna selection section 131 may select those UEs with good channel conditions from among UEs having sent signals through antennas first, and select antennas having received signals, whose weighted SNR value is greater than or equal to a preset threshold, from the selected UEs.

The processing section 132 may combine signals received through the selected antenna and decode the combined signal. The processing section 132 may process signals received through the antenna selected by the antenna selection section 131 in real time.

Figure 4:
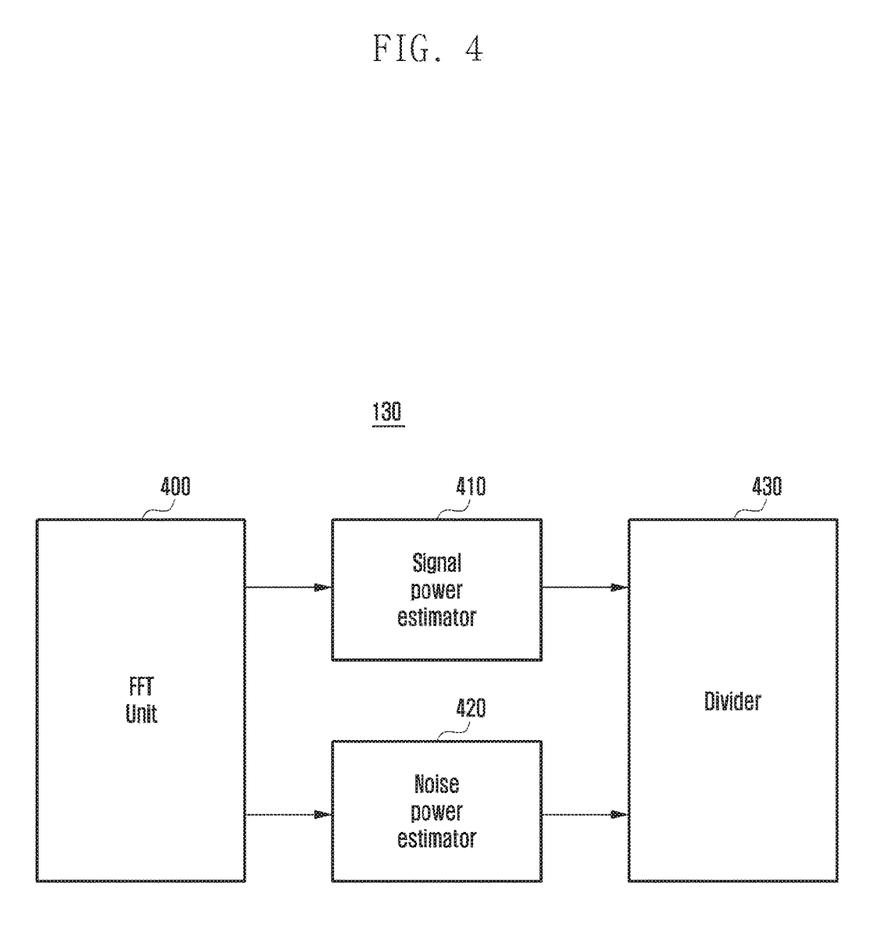
FIG. 4 is a block diagram of a signal-to-noise ratio (SNR) measurement section according to an embodiment of the present disclosure.

FIG. 4 is a block diagram of the SNR measurement section 130 according to an embodiment of the present disclosure.

Referring to FIG. 4, the SNR measurement section 130 may include a fast Fourier transform (FFT) unit 400, a signal power estimator 410, a noise power estimator 420, and a divider 430.

When a signal is input through the transceiver unit 210, the ITT unit 400 of the SNR measurement section 130 may apply fast Fourier transform to the input signal.

The signal power estimator 410 may estimate the signal power of the fast Fourier transformed signal. The noise power estimator 420 may estimate the noise power of the fast Fourier transformed signal.

The divider 430 may obtain an SNR value by dividing the signal power value estimated via the signal power estimator 410 by the noise power value estimated via the noise power estimator 420. Then, the SNR measurement section 130 may forward the SNR value obtained via the divider 430 to the antenna selection section 131 as shown in FIG. 3A.

Alternatively, the SNR measurement section 130 may forward the SNR value obtained via the divider 430 to the weighting control section 133 as shown in FIG. 3B.

Figure 5:
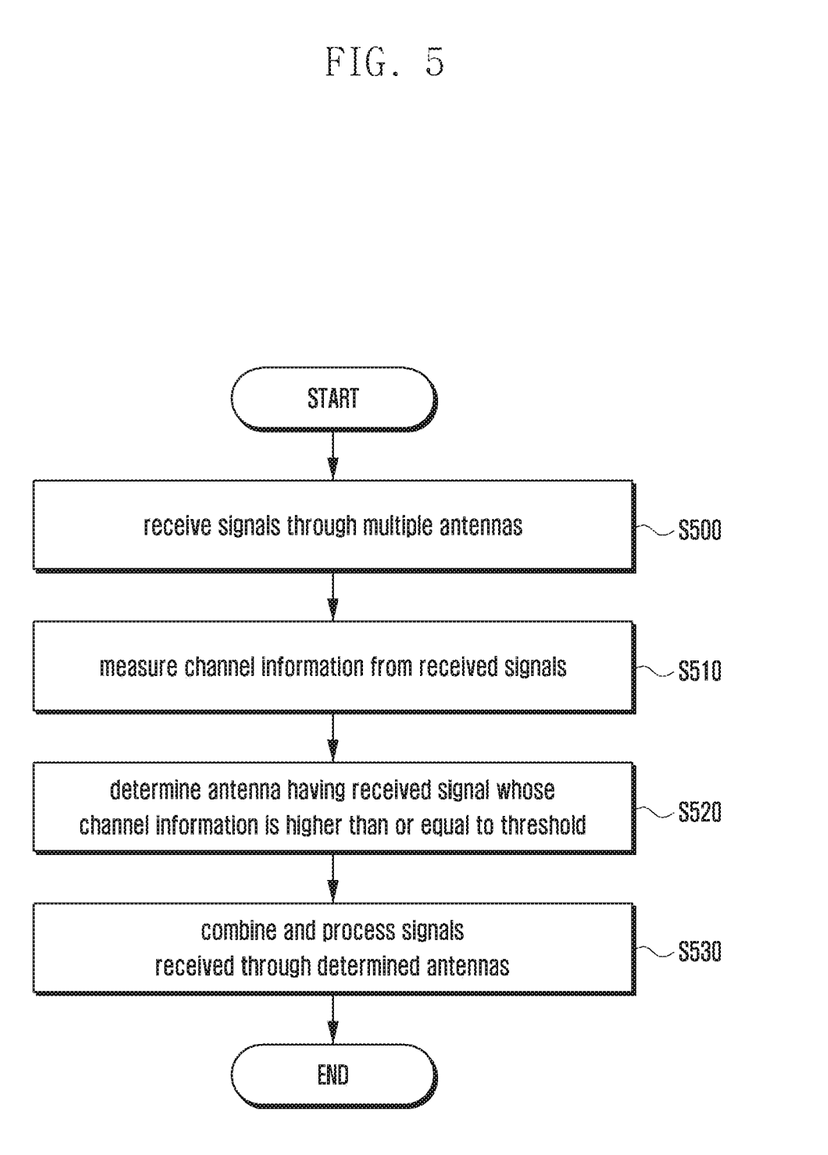
FIGS. 5 and 6 are flowcharts of an antenna selection method for the base station according to embodiments of the present disclosure.

FIG. 5 is a flowchart of an antenna selection method for the BS according to an embodiment of the present disclosure.

Referring to FIG. 5, at operation S500, the BS 100 receives signals through multiple antennas. At operation S510, the BS 100 measures channel information of the received signals. For example, the BS 100 may measure the SNR or received power of signals received through multiple antennas as channel information.

At operation S520, the BS 100 determines antennas having received signals whose channel information is higher than or equal to a preset threshold. For example, when a high level of channel information indicates better channel conditions as in the case of the SNR, the BS 100 may determine a signal whose channel information is higher than or equal to a preset threshold first and identify the antenna having received the determined signal.

At operation S530, the BS 100 combines and processes the signals received through the determined antennas. For example, when a preset number of antennas are determined, the BS 100 may combine multiple signals received through the determined antennas and decode the combined signal.

When the distance between the UE and antenna is small, it is highly probable that channel conditions are good. Hence, the BS 100 may perform antenna selection in consideration of the distance between the UE and each antenna.

Figure 6:
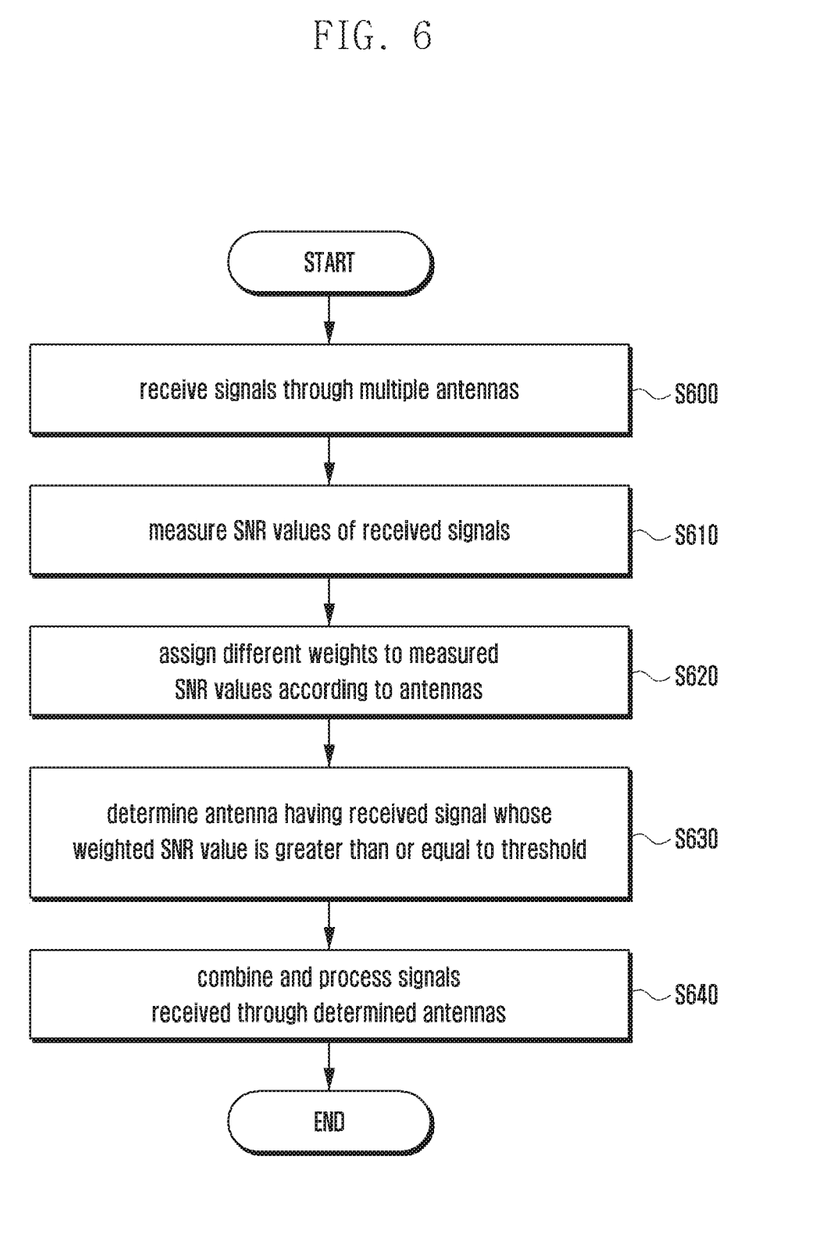

FIG. 6 is a flowchart of an antenna selection method for the BS in consideration of the distance between the UE and each antenna according to an embodiment of the present disclosure.

Referring to FIG. 6, at operation S600, the BS 100 receives signals through multiple antennas. At operation S610, the BS 100 measures SNR values of the received signals. In addition to the SNR, as channel information, the BS 100 may measure any other information enabling prediction of antenna channel states, such as received power.

At operation S620, the BS 100 assigns different weights to the measured SNR values according to antennas having received signals. The BS 100 may assign different weights to the measured SNR values according to the locations of antennas having received signals.

For example, the BS 100 may assign a high weight to an antenna placed in the same sector as the UE. That is, when the distance between the HE and an antenna is large, the BS 100 may assign a low weight to the SNR of a signal received through the antenna.

At operation S630, the BS 100 determines an antenna having received a signal whose weighted SNR value is greater than or equal to a preset threshold. At operation S640, the BS 100 combines and processes signals received through the determined antenna.

As described above, the BS 100 may select an antenna to receive a signal in consideration of the measured channel information and the location of the UE.

Consequently, the base station may select an antenna enabling effective uplink communication with a UE in real time among multiple antennas.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of processing signals by a base station, the method comprising:
configuring an operating mode of the base station to be a multi-user multiple input multiple output (MU-MIMO) operating mode;
receiving signals using multiple antennas by using the MU-MIMO operating mode;
measuring channel information from each of the received signals;

identifying a user equipment (UE) among multiple UEs based on a modulation and coding scheme (MCS) and a number of allocated resource blocks (RBs);

determining antennas based on channel information corresponding to signals received from the identified UE; and combining and processing signals received using the determined antennas.

2. The method of claim 1, wherein the channel information includes information on a signal-to-noise ratio (SNR) or information on a power of the received signals.

3. The method of claim 1, further comprising:

measuring a signal-to-noise ratio (SNR) or a power of the received signals using the multiple antennas on a subframe basis; and determining antennas whose SNR or received power is higher than or equal to a preset threshold on the subframe basis.

4. The method of claim 1, wherein the determining of the antennas comprises:

determining the antennas based on the channel information measured at an uplink data channel; and using a signal received via the determined antennas for an uplink control channel corresponding to the uplink data channel.

5. The method of claim 1, wherein the determining of the antennas comprises:

assigning different weights to the measured channel information according to antennas having received the signals; and determining antennas whose weighted channel information is greater than or equal to a preset threshold.

6. The method of claim 1, wherein the combining and processing of the signals comprises:

combining multiple signals received using the determined antennas; and decoding the combined signal.

7. A base station comprising:

a transceiver configured to send and receive signals using multiple antennas; and at least one processor; and a memory configured to store computer program instructions configured, when executed by the at least one processor, to cause the base station at least to perform:

configuring an operating mode of the base station to be a multi-user multiple input multiple output (MU-MIMO) operating mode, measuring channel information from each of the signals received by using the MU-MIMO operating mode, identifying a user equipment (UE) among multiple UEs based on a modulation and coding scheme (MCS) and a number of allocated resource blocks (RBs), determining antennas based on channel information corresponding to signals received from the identified UE, and combining and processing signals received using the determined antennas.

8. The base station of claim 7, wherein the channel information includes information on a signal-to-noise ratio (SNR) or information on a power of the received signals.

9. The base station of claim 7, wherein the computer program instructions are further configured, when executed by the at least one processor, to cause the base station to perform:

measuring a signal-to-noise ratio (SNR) or a power of the received signals using the antennas on a subframe basis, and determining antennas whose SNR or received power is higher than or equal to a preset threshold on the subframe basis.

10. The base station of claim 9, further comprising a SNR measuring section.

11. The base station of claim 10, wherein the SNR measuring section comprises:

a fast Fourier transform (FFT) unit;

a signal power estimator;

a noise power estimator; and a divider.

12. The base station of claim 7, wherein the computer program instructions are further configured, when executed by the at least one processor, to cause the base station to perform:

determining the antennas based on the channel information measured at an uplink data channel, and using a signal received via the determined antennas for an uplink control channel corresponding to the uplink data channel.

13. The base station of claim 7, wherein the computer program instructions are further configured, when executed by the at least one processor, to cause the base station to perform:

assigning different weights to the measured channel information according to antennas having received the signals, and determining antennas whose weighted channel information is greater than or equal to a preset threshold.

14. The base station of claim 7, wherein the computer program instructions are further configured, when executed by the at least one processor, to cause the base station to perform:

combining multiple signals received using the determined antennas; and decoding the combined signal.

* * * * *